United States Patent [19]
Kouda et al.

[11] Patent Number: 5,904,804
[45] Date of Patent: May 18, 1999

[54] BATTERY LABEL WRAPPING METHOD AND APPARATUS

[75] Inventors: Minoru Kouda, Hirakata; Hiroshi Suyama, Neyagawa; Ichiro Murata, Kadoma, all of Japan

[73] Assignee: Matsushita Electric Industrial Co., Ltd., Osaka, Japan

[21] Appl. No.: 08/697,959

[22] Filed: Sep. 4, 1996

[30] Foreign Application Priority Data

Sep. 6, 1995 [JP] Japan .................................. 7-228768

[51] Int. Cl.⁶ .................................................. B32B 31/00
[52] U.S. Cl. ...................................... 156/540; 156/DIG. 1
[58] Field of Search .............................. 156/DIG. 1, 540

[56] References Cited

U.S. PATENT DOCUMENTS

| | | | |
|---|---|---|---|
| 2,524,945 | 10/1950 | Von Hofe | 156/320 |
| 3,116,193 | 12/1963 | Ehlebeck | 156/215 |
| 4,838,982 | 6/1989 | Klaesser et al. | 156/520 |
| 5,437,759 | 8/1995 | Westbury | 156/566 |

*Primary Examiner*—Francis J. Lorin
*Attorney, Agent, or Firm*—Ratner & Prestia

[57] ABSTRACT

A method of wrapping labels about batteries comprising the steps of peeling off individual labels provisionally glued on a band-shaped base paper, holding the individual labels on the surface of a continuously rotating label drum using suction forces applied trough holes or passages on the surface of the label suction drum, and wrapping the labels on the label suction drum on the outer circumference of rotating batteries continuously supplied by a battery conveying table. The apparatus of the invention comprises a battery conveying table for rotatably conveying batteries to a predetermined position for receiving the label, a label drum for holding the labels by suction forces and conveying the labels to the predetermined position, and a battery rotation belt for rotating the batteries while pressing the label to the outer circumference of the battery after the label is positioned by the suction drum, and wrapping the label to the outer circumference of the battery by rotating the battery.

48 Claims, 8 Drawing Sheets

BATTERY LABEL WRAPPING METHOD AND APPARATUS

FIELD OF THE INVENTION

The present invention relates to a method and apparatus for wrapping a label about the outer circumference of a cylindrical battery.

BACKGROUND OF THE INVENTION

A label is wrapped and fastened to the outer circumference of the can of a cylindrical battery to insulate the side wall of the can and to indicate the product name.

A conventional battery label wrapping method and apparatus is described with reference to FIG. 7.

In FIG. 7, a cylindrical battery 52 is rotatably supported by a battery support roller 54 which is attached to a chain conveyor 55. The battery 52 is conveyed continuously from left to right in the drawing.

A label 51 to be wrapped about the outer circumference of the battery 52 is glued at equal intervals on a band-shaped base paper 57. While being conveyed from left to right in the drawing, the base paper 57 is folded at an acute angle when passing a sharp edge of the end of a stripper guide 56. This folding causes the label 51 to peel off the base paper 57 sequentially from the leading end. When the leading end portion of the peeled label 51 comes to a specific position suited to label gluing, feed by a base paper feed roller 58 is stopped temporarily until the battery 52 reaches a specific position. When the battery 52 reaches the specific position, the leading end of the label 51 is pinched between the battery 52 and a belt 61 running at high speed. The label 51 is wrapped about the outer circumference of the battery 52 as it is being pulled by the moving belt 61.

In such a label wrapping apparatus, to facilitate the relative positioning of battery 52 and label 51, the base paper 57 with the label glued on runs intermittently. Compared with the case of continuous supply of the label 51, a servo motor or electromagnetic clutch of greater starting torque is required and inferior productivity is achieved. Such an apparatus requires precise starting and stopping of the label feed. As speed increases, differences in label rigidity and the adhesiveness of the adhesive agent make it difficult to supply the label accurately at the label wrapping starting position on the battery. This leads to variations in label wrapping.

If the stiffness of the label 51 is weak and the adhesiveness of the base paper 57 is too strong, as shown in FIG. 8, incorrect peeling occurs due to pulling by the base paper 57.

When using the chain conveyor 55, elongation or wear of the chain, or wear the of chain running rail may occur. This makes it difficult to position the battery with the necessary precision, and label wrapping deviation is likely to occur.

SUMMARY OF THE INVENTION

The present invention solves the problems with prior art devices and methods. It is a primary goal thereof to realize stabilization of label wrapping about the outer circumference of a battery while achieving high speed processing.

The invention pertains to a method of wrapping a label on a battery comprising the steps of:

continuously peeling separate labels from a plurality of labels provisionally glued on a band-shaped base paper, positioning each label separately on the surface of a label suction drum rotating continuously said drum forming suction by a vacuum suction means, and wrapping each of the labels that are on the label suction drum about the outer circumference of individually rotating batteries continuously supplied by a battery conveying table.

The invention also pertains to an apparatus for wrapping a label on a battery comprising:

a battery conveying device for holding and moving the batteries around an axis of rotation while at the same time holding the batteries for rotation individually about the longitudinal axis of the battery, a label suction drum for holding a label by suction and conveying the label to a specific position, and a battery rotating belt for rotating the battery while pushing the label against the outer circumference of the battery, and wrapping the label about the outer circumference of the battery.

In this embodiment, the label can be wrapped about the outer circumference of the battery continuously and at high speed without deviation in the wrapping of the label.

In this embodiment, the label separated from the base paper is held by the vacuum suction means formed on the label suction drum, and it is preferred that the label be continuously wrapped about the outer circumference of the rotatably held battery.

It is preferred to wrap the separated label about the outer circumference of the battery by pressing the label against the outer circumference of the battery while simultaneously rotating the battery. This enables more efficient wrapping of the label about the outer circumference of the battery.

It is preferred that the battery conveying device (table) be a rotary element part of running path of the battery rotating belt has the same center of rotation as the label suction drum, and the other part of the running path of the battery rotating belt has the same center of rotation as the battery conveying table.

In the preferred embodiment, the separated labels are supplied to the outer circumference of the battery continuously in a direction tangential to the outer circumference. This allows labels to be supplied on the outer circumference of batteries along the tangential direction.

In one embodiment, a magnet is placed on the battery conveying table or in its vicinity, and the battery is attracted to the battery support roller by the magnetic force of the magnet. In this embodiment, when wrapping the label about the battery, the label can be applied in a predetermined area.

In the preferred embodiment, by forming a slit on or marking the label suction drum, a sensor can detect the position of the label on the label suction drum, and the operation is controlled based on this position. Accordingly, the label can be wrapped about the outer circumference of the battery at high precision.

In the preferred embodiment, the label supply speed is adjusted by controlling a speed adjusting motor having a differential gear mechanism installed in the drive system of the base paper feed roller for feeding the base paper. This enables the label to be wrapped about the outer circumference of the battery more precisely.

REFERENCE NUMERALS

Figure 1:
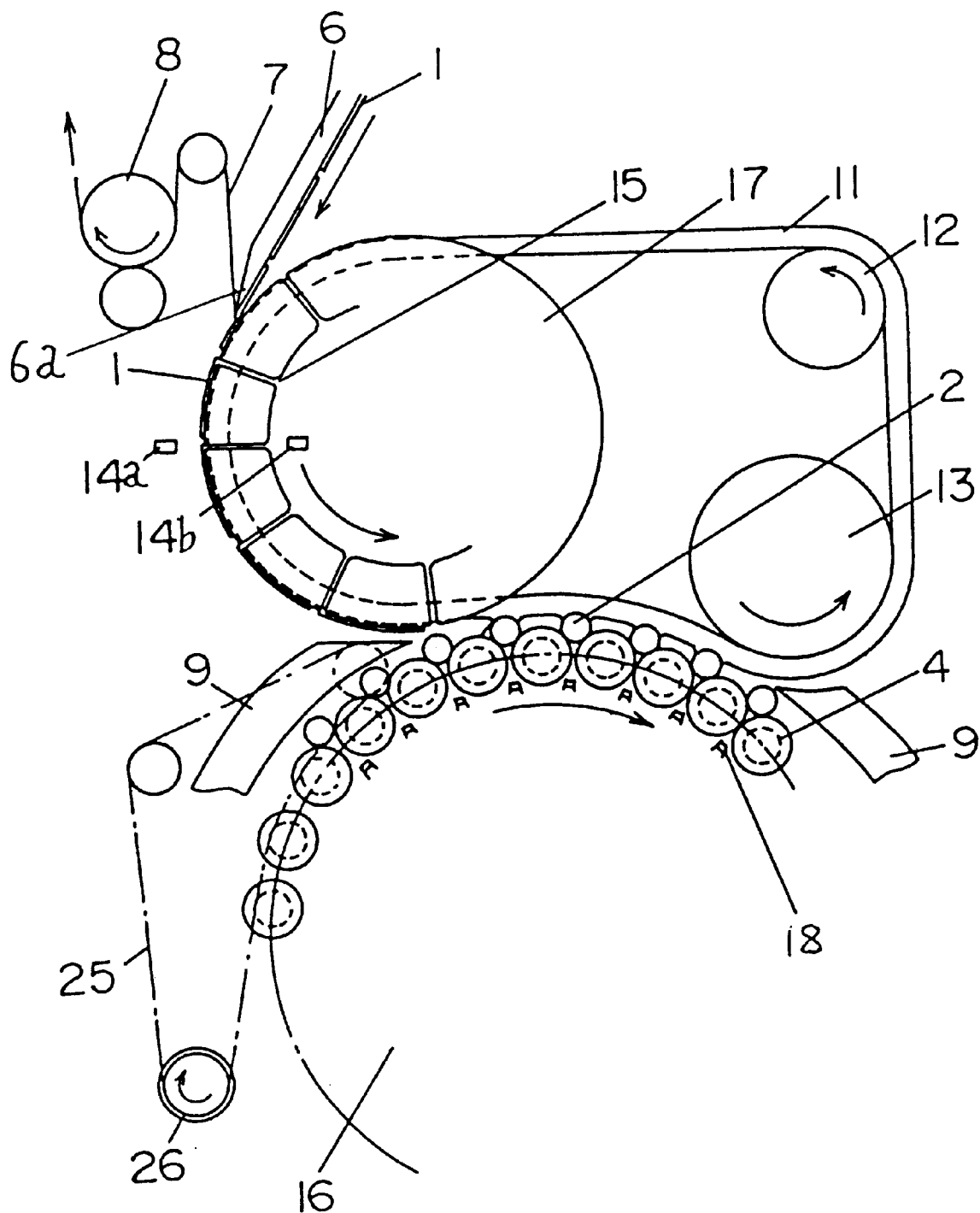
FIG. 1 is a fragmentary elevational view of principal parts of a label wrapping apparatus according to an embodiment of the invention.

| | Reference Numerals |
|---|---|
| 1 | Label |
| 2 | Cylindrical battery |
| 3 | Vacuum passage |
| 4 | Battery supporting roller |
| 6 | Stripper guide |
| 6a | Edge of stripper guide |
| 7 | Base paper |
| 8 | Base paper feed roller |
| 9 | Battery holder guide |
| 10 | Bearing |
| 11 | Label holder flat belt |
| 12 | Belt pulley |
| 13 | Belt pulley |
| 14a, 14b | Photoelectric sensors |
| 15 | Slit |
| 16 | Battery conveying turntable |
| 17 | Label suction drum |
| 18 | Magnet |
| 19 | Ring |
| 20 | Differential gear device |
| 21 | Output gear of differential gear device |
| 22 | Input pulley of differential gear device |
| 23 | Speed adjusting pulley |
| 24 | Speed adjusting motor |
| 25 | Timing belt |
| 27 | Small motor |
| 26 | Battery rotation drive pulley |
| 31 | Main drive shaft |
| 32a, 32b, 32c, 32d, 32e, 32f | Gears |
| 51 | Label |
| 52 | Battery |
| 54 | Battery support roller |
| 55 | Chain conveyor |
| 56 | Stripper guide |
| 57 | Base paper |
| 58 | Base paper feed roller |
| 61 | Belt |

DETAILED DESCRIPTION OF THE INVENTION

Referring to the drawings, the label wrapping method for a battery and its apparatus according to the invention are described in detail below.

FIG. 1 is a fragmentary elevational view of principal parts of an apparatus for wrapping a label about a battery according to the invention. In FIG. 1, a label 1 is supplied from a label supply paper comprising a band-shaped base paper 7, and a plurality of labels temporarily glued at equal intervals on the base paper 7. Each label 1 of a plurality of labels is separated from the base paper 7 when passing over a sharp edge 6a of a stripper guide 6. The separated label 1 is sucked by vacuum and held on the outer circumference of a label suction drum 17, which rotates continuously at a constant speed. The base paper 7 is fed in the direction of the arrow shown under the labels by a base paper feed roller 8. The trajectory of the label 1 on the label suction drum 17 leads to contact of the label 1 and the outer circumference of a rotating battery 2 held on the battery conveying device (turntable) 16. The label 1 is supplied continuously along the tangential direction to the outer circumference of the battery 2. The battery conveying turntable 16 rotates synchronously with the label suction drum 17. The batteries 2 are continuously conveyed to the label gluing position by the battery conveying turntable 16.

The label 1 is supplied tangentially to the outer circumference of the label suction drum 17. Before the leading end of the label 1 passes the sharp edge 6a of the stripper guide 6, the label 1 is sucked by suction force from a vacuum passage 3 (see FIG. 2) in the label suction drum 17. Immediately after the label 1 passes the edge 6a of the guide 6 and is separated from the base paper, the label 1 is securely positioned and held on the label suction drum 17 by the effect of the vacuum. Hence, problems such as the wrapping deviation of the label decrease significantly. As a result, the label 1 can be wrapped about the battery 2 at high speed, continuously, and stably.

Figure 2:
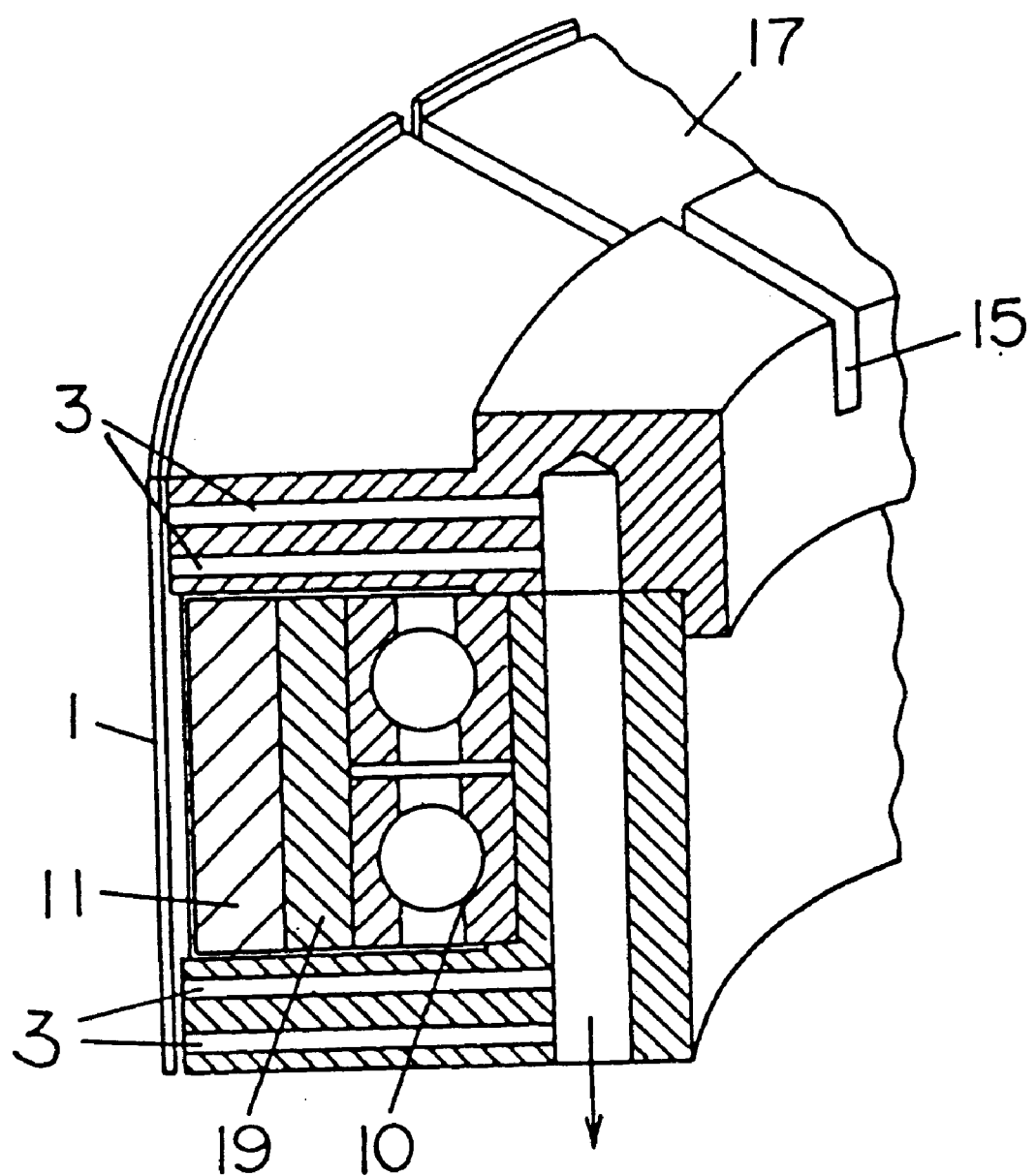
FIG. 2 is a fragmentary sectional view showing the structure of a label suction drum in the label wrapping apparatus according to an embodiment of the invention.

Referring to FIG. 2, the label suction drum 17 is described below. FIG. 2 is a sectional view of principal parts of the label suction drum 17 shown in FIG. 1. The label suction drum 17 can correct fluctuations of the suction position of the label 1. In FIG. 2, at the upper end of the label suction drum 17, a slits 15 from the circumferential surface to the drum axial center equally divides the drum circumference into blocks slightly longer than the label 1. The suction passages 3 are provided in a plurality of rows and at a plurality of positions in each section of the label suction drum 17 equally divided by slits 15. The passages 3 hold the upper and lower sides of the label 1 by. suction created by negative pressure (vacuum) generated by a vacuum pump (not shown). The slit 15 serves as the reference position for adjusting the position of the label 1.

Figure 3:
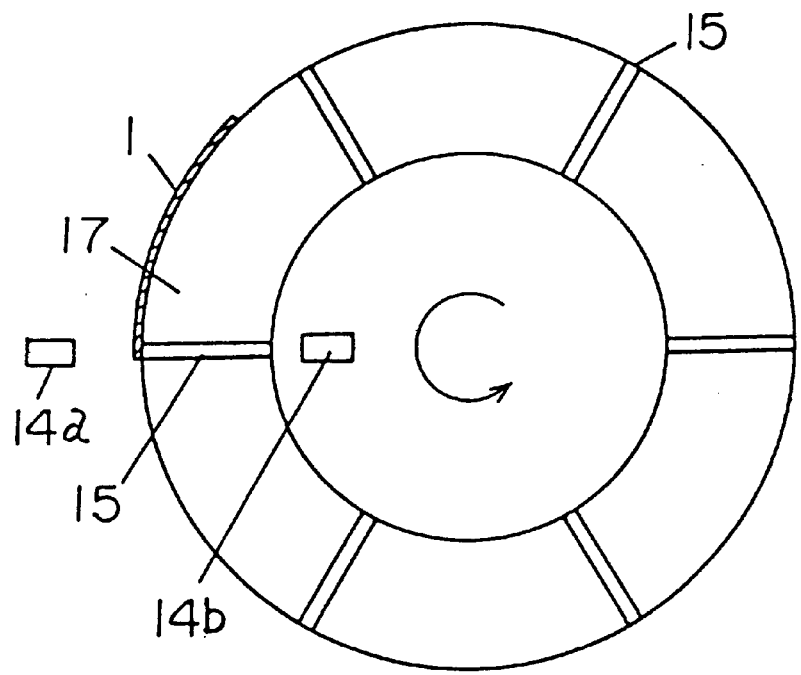
FIG. 3(A) shows one configuration of slits, a label and sensors of the label suction drum of the label wrapping apparatus in an embodiment of the invention.
FIG. 3(B) shows another configuration of slits, label and sensors.
Figure 3:
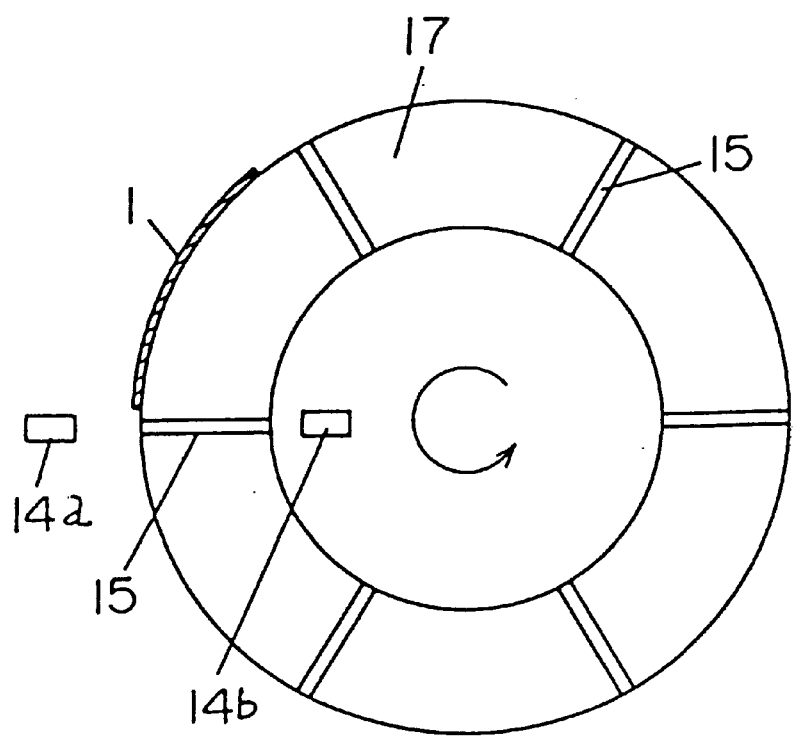

FIG. 3(A) shows the condition where the slit 15 is plugged with the label 1 when the leading end of the label 1 is sucked to the label suction drum 17. In FIG. 3(A), a pair of transmission type photoelectric sensors, 14a and 14b, are disposed outside and inside of the label suction drum 17, respectively. When the light is shielded between photoelectric sensor 14a and photoelectric sensor 14b by the label 1, a signal is transmitted to the drive system of the base paper 7 to slow down the label supply speed.

FIG. 3(B) is a diagram showing the condition where the slit 15 not plugged with the label 1. In this case, the pair of photoelectric sensors 14a, 14b are in light transmission state, and a signal for accelerating the supply speed of the label 1 is sent to the drive system of the base paper 7. This results in the leading ends of all conveyed labels being near the slit 15, and the precision of label wrapping is stabilized. The range of adjustment for the label supply speed is narrow and in the usual operation, it is set so that the back end of the label 1 will not plug the slit 15.

Described next is the drive system of the base paper feed roller 8 for adjusting the label supply speed. In FIG. 1, rotation of the base paper feed roller 8 is variable with two speeds, high speed rotation and low speed rotation. High speed rotation refers to a rotating speed in which the supply speed of the label 1 is faster than the feed speed of the battery 2 by the battery conveying turntable 16, or the speed synchronized with the rotating speed of the label suction drum 17. Low speed rotation refers to a rotating speed in which the supply speed of the label is slower than the speed synchronized with the rotation of the battery conveying turntable 16 or the label suction drum 17. A variable speed range of about ±1% is set as the synchronous rotating speed.

Figure 4:
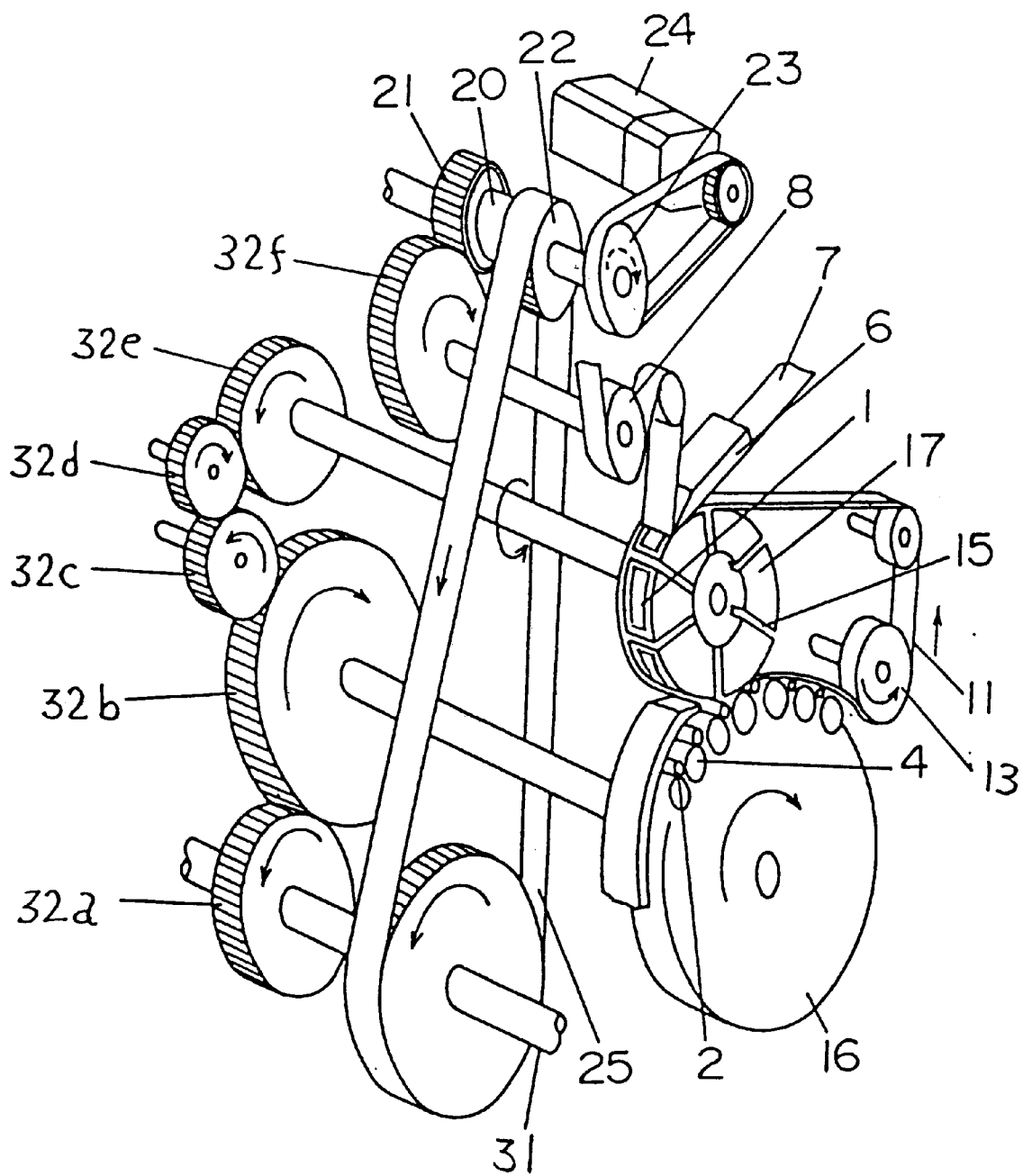
FIG. 4 shows a power transmission system of the label wrapping apparatus according to the invention.

To change the label feed speed to either high speed rotation or low speed rotation, a differential gear device 20 can be employed which will enhance the reliability of the label wrapping apparatus, simplify the electric control circuit, and save the facility cost as explained with reference to FIG. 4. FIG. 4 is a perspective view showing the outline of a power transmission system of the label wrapping apparatus. In FIG. 4, the power from the main drive source is transmitted through a main drive shaft 31, differential gear device 20, output gear 21, base paper feed roller 8, and a plurality of gears 32a, 32b, 32c, 32d, 32e, 32f, to the battery conveying turntable 16, label suction drum 17, belt pulleys 12, 13, and label holder flat belt 11, in a completely synchronized state. Power to the base paper feed roller 8 is transmitted through the differential gear device 20. For the differential gear device 20, a Harmonic Differential Unit (tradename) is used. When rotating the label feed roller 8 at high speed, the speed adjusting motor 24 is stopped. When rotating the label feed roller 8 at low speed, the speed adjusting motor 24 is rotated, and a specified rotating speed is given to the pulley 23 in reverse direction to the rotating speed of the pulley 22.

By repeating such operation, the position of the label 1 on the label suction drum 17 can be controlled within a predetermined range. Therefore, the position of the battery 2 contacting the leading end of the label 1 on the outer circumference of the battery 2 on the battery conveying turntable 26 can be controlled within a specific range. As a result, the label can be wrapped about the battery stably and with high precision.

In this embodiment, the suction position of the label 1 is detected by the combination of the slit 15 and the photo-electric sensors 14a, 14b. Instead of using the slit 15, by marking (not shown) the label 1 or the label suction drum 17, the suction position of the label 1 can be detected by the marking and the photoelectric sensors.

To maintain precise position of the label on the battery in the axial center direction, the label 1 is manufactured with a variation in the position of the label of ±0.2 mm in relation to the width of the base paper 7. The base paper 7 is guided in the width direction, by the groove formed in the stripper guide 6, at a precision of ±0.15 mm, including the fluctuations of the base paper width.

After the base paper 7 and label 1 are separated by the stripper guide 6, the precise position of the label 1 is maintained by being held by suction passages 3 in the label suction drum 17. The label suction drum 17 is preloaded in bearings, and is hence fixed in position in the axial center direction. The precise position of the battery 2 in the axial center direction is assured by using the cam surface as the reference surface of the battery when moving the battery 2 in the axial center direction by force of the cam until the battery 2 reaches the label wrapping position.

Stable label wrapping is realized at high precision and high speed by rotating the battery just before the label contacts the outer circumference of the battery. The battery is rotated in the label wrapping direction at a peripheral speed nearly coinciding with the label wrapping speed.

Figure 6:
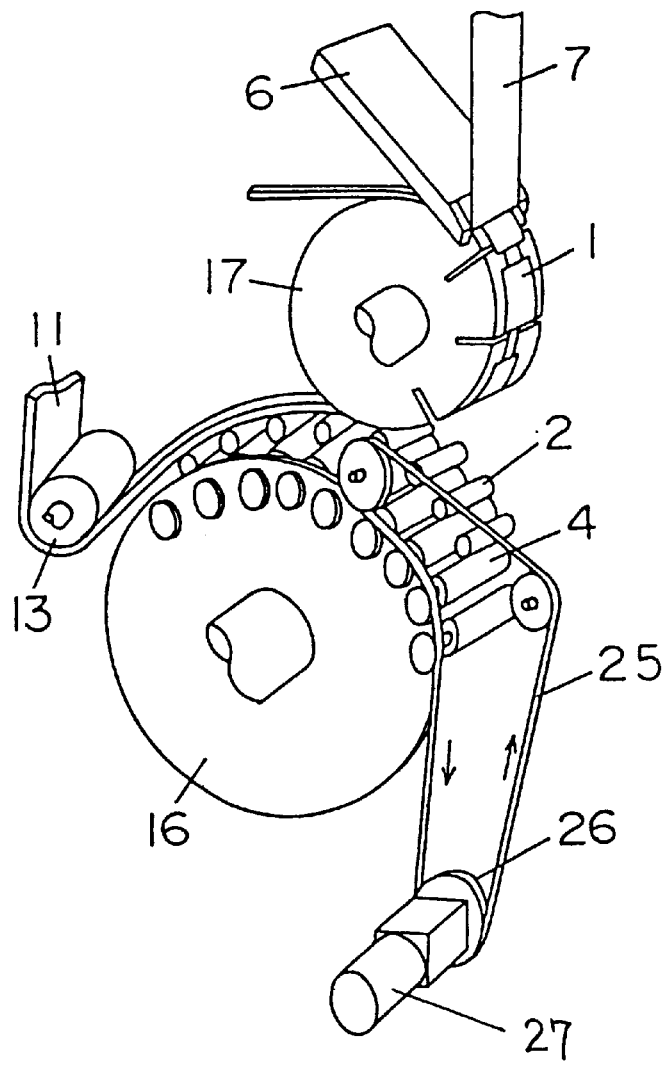
FIG. 6(A) is a fragmentary perspective view seen from the back side of principal parts of a label wrapping apparatus according to the invention.
FIG. 6(B) is a fragmentary sectional view of part of the label wrapping apparatus of the invention as seen from the battery conveying direction.
Figure 6:
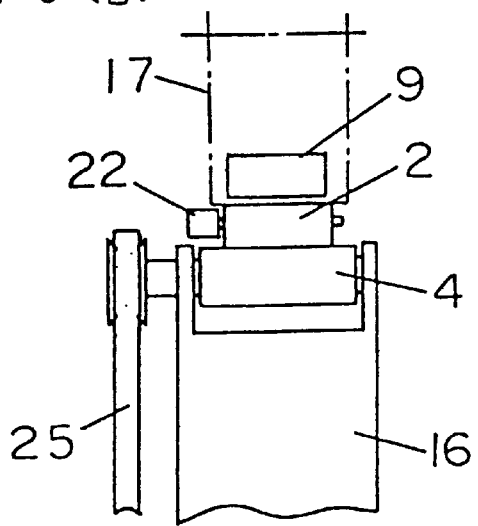
Figure 7:
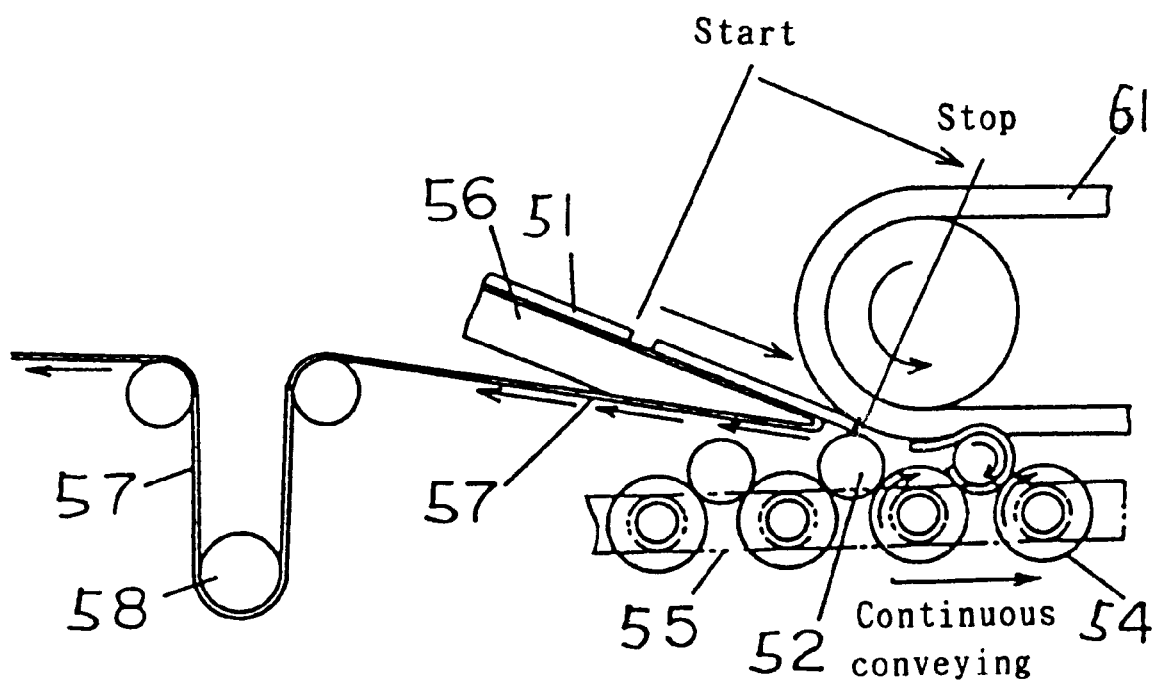
FIG. 7 is a fragmentary elevational view of a conventional label wrapping apparatus.
Figure 8:
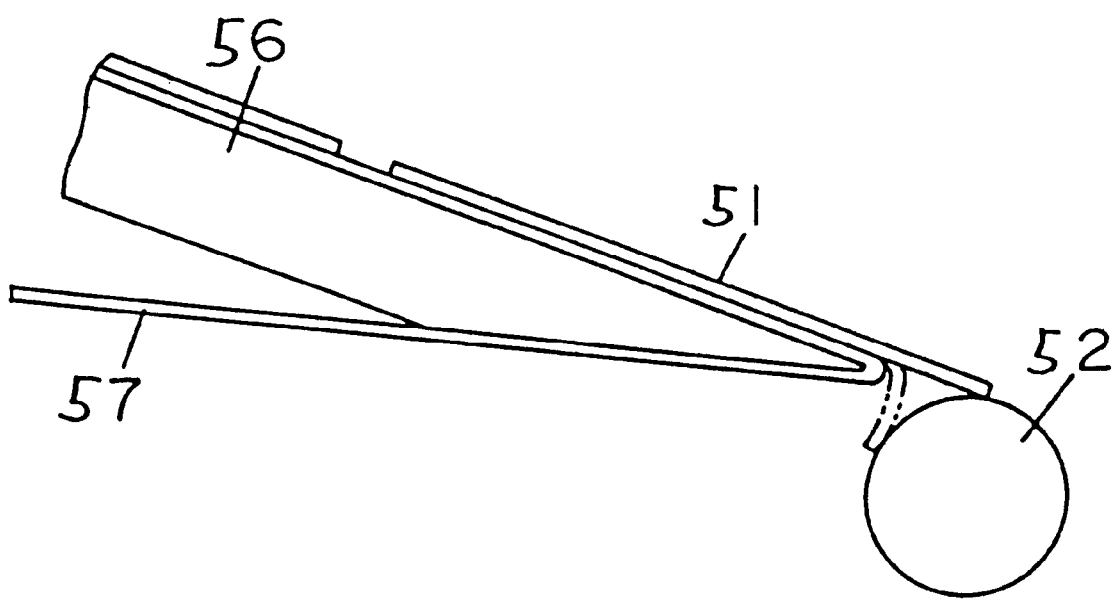
FIG. 8 shows the occurrence of a malfunction in a conventional label wrapping apparatus.

An example of a method of wrapping a label about a battery is described. FIG. 6(A) is a perspective view of the apparatus of the invention as seen from the back and FIG. 6(B) is a view as seen from the battery conveying direction. The battery support roller 4 provided in the battery conveying turntable 16 is in an elongated surface shape extending along the longitudinal axis of battery 2, and as the running belt 25 contacts the outer circumference of the roller 4 just before the label wrapping start position, the torque is transmitted to the battery support roller 4. The belt 25 is driven through a battery rotation drive pulley 26 which is rotated by a small motor 27.

As shown in FIG. 1, the belt 11 for wrapping the label 1 while pressing against the outer circumference of the battery 2 has the same center of rotation s the label suction drum 17 in part of the running path, and other part has the same center of rotation as the battery conveying turntable 16. The belt 11 playing the role of pressing the label peeled from the band-shaped base paper 7 to the cylindrical battery 2, and the role of rotating and driving the battery 2 is fitted into a belt groove formed in the outer circumference of the label suction drum 17 as shown in FIG. 2. The belt 11 is placed around the label suction drum 17, the radius of the belt 11 as it passes over drum 17 having a dimension slightly smaller than the radius of the label suction drum 17. Therefore the belt is in a slightly recessed position, and the belt does not contact the label 1. The belt 11 is rotatably supported on the ring 19 holding a bearing 10 at its inner circumference. The belt 11 is running at a high label wrapping speed different from the rotating speed of the label suction drum 17. Therefore, when the belt 11 presses the label 1 against the outer circumference of the battery 2, the label 1 is wrapped about the outer circumference of the battery 2 in a short time. In this construction, the time the battery is on, the battery conveying turntable 16 is shortened, and the label wrapping apparatus is reduced in size.

In FIG. 1 there is only one belt 11. Instead of one belt, two belts with different belt widths may be installed, and the width of the surface pressing the label against the battery 2 may be increased, so the wrapping of the label 1 about the battery 2 may be improved.

In FIG. 1, a magnet 18 is shown installed at a proper position on the battery conveying turntable 16. In the rotation of the battery on the battery conveying turntable 16 for wrapping the label, or in the portion of the rotation for shifting the role of the battery holder by the holder guide 9 of the battery 2 and the belt 11 provided at the table 16 side, if any part fails to hold the battery 2, a magnetic force acts on the battery can made of ferromagnetic material, and the battery 2 is attracted to the roller 4. The magnetic force of the magnet acting on the battery can alleviate problems such as vibration caused by dynamic imbalance of the battery during high speed rotation. The label 1 can then be stably wrapped about the outer circumference of the battery.

In FIG. 1, the wide gap between the battery 2 and magnet 18 is merely for the ease of understanding of the diagram, and they may be set closer to each other. Instead of the installation of the magnet 18 shown in FIG. 1, a magnet may be assembled into the roller 4 itself. Either a permanent magnet or an electromagnet can be used for the magnet 18.

Figure 5:
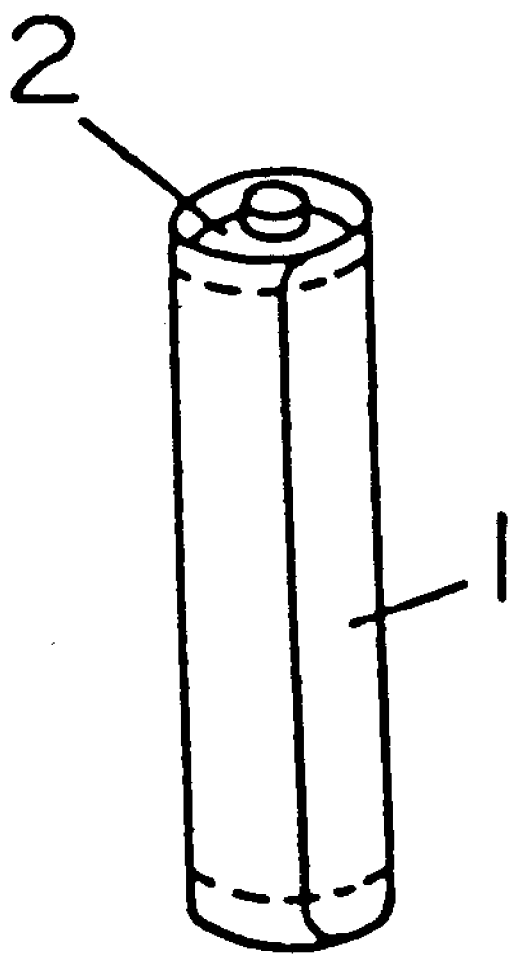
FIG. 5 is a perspective view of a battery immediately after wrapping the label about the battery, according to a label wrapping method of the invention.

As shown in FIG. 5, after wrapping the label 1 about the battery 2, the label height is longer than the battery height. Therefore, the label 1 is not in tight contact with the battery 2 at the ends of the battery 2, and wrapping is incomplete. However, a heat shrink resin is used as the material for the label. Therefore, heating the label 1 after wrapping tightly contacts the label 1 with the upper and lower ends of the battery 2.

By using a label suction drum, the action of peeling of the label from the base paper, and the action of wrapping of the label about the battery may take place at different locations. It is therefore possible to feed and supply the labels continuously, not intermittently. The label can be wrapped about the battery with high precision, at high speed, continuously, and stably. As a result, both the label wrapping quality and productivity can be enhanced at the same time.

In the preferred embodiment of the invention, the label separated from the base paper is held by vacuum holding means formed in the label suction drum, and the label is wrapped about the outer circumference of the rotating battery.

In the preferred embodiment of the invention, the battery is rotated while applying pressure to the outer circumference of the battery by the battery rotating belt through the separated label, and the separated label is wrapped about the outer circumference of the battery.

In the preferred embodiment of the invention, the separated labels are continuously supplied onto the outer circumference of the battery in a direction tangential to the outer circumference.

In the preferred embodiment of the invention, a magnet is installed on the battery conveying table or its vicinity, and the magnet applies a magnetic force to hold the battery in the direction of the battery support roller.

In the preferred embodiment of the invention, a slit or marking is formed on the label suction drum, and a sensor is installed to detect the label position on the label suction drum to control the label position.

In the preferred embodiment of the invention, a speed adjusting motor having a differential gear mechanism is installed in the drive system of the base paper feed roller for adjusting the label supply speed.

Thus, in the method and apparatus of the above embodiment, the label can be wrapped about the outer circumference of the battery at high precision, at high speed, continuously, and stably.

What is claimed is:

1. A method of wrapping a label about a battery, said method comprising the steps of:
   (a) holding said label on a surface of a rotating label suction drum having a vacuum source;
   (b) causing said battery to rotate by rotating a plurality of rollers situated under said battery; and
   (c) wrapping said label about an outer circumference of the battery while the battery rotates on two rollers of the plurality of rollers.

2. A method according to claim 1, including the step of rotating a conveying table for conveying the battery, said conveying table adjusted to rotatably support the battery.

3. A method according to claim 2, wherein the battery is cylindrical in shape.

4. A method according to claim 1, wherein step (c) of wrapping the label on the outer circumference of the battery is effected by placing each label on the outer circumference of the battery by rotating the battery, while pressing the label onto the outer circumference of the battery by a battery rotating belt.

5. A method according to claim 1, wherein speed of supplying the label into the suction drum is adjusted by a base paper feed roller adapted for conveying base paper separated from the labels.

6. A method according to claim 1, wherein the battery is cylindrical in shape, and each label is supplied continuously on the outer circumference of the battery in a direction tangential to the outer circumference.

7. A method according to claim 1, wherein the label suction drum is equally divided by slits on its outer circumference, and whenever a relative positions of the separated label held on the label suction drum and the slit are detected by a sensor positioned corresponding to the slit, and whenever speed for supplying the label is adjusted by the signal indicating the position of the label.

8. A method according to claim 1, including marking the outer circumference of the label suction drum to keep a position of each label held on an outer circumference of the label suction drum within a predetermined range, an installing a sensor at a position corresponding to the marking, the relative position of the label and marking detected by the sensor, and adjusting speed for supplying the label by a signal caused by detection of the relative position.

9. A method according to claim 1 including forming a passage in a surface of the label suction drum, and evacuating the passage to a negative pressure.

10. A method of wrapping a label about a cylindrical battery comprising the steps of:
   (a) preparing a label wrapping apparatus consisting of
      a battery conveying turntable for rotatably conveying the battery to a position for receiving the label,
      a battery rotation driving belt for i) rotating the battery about an axis of the battery prior to and after contacting the label and ii) wrapping the label on an outer circumference of the battery, while pressing the label onto the outer circumference of the battery held on the battery conveying turntable,
      a label suction drum having a plurality of tiny holes on the outer circumference thereof for separating the label from a band-shaped base paper by a vacuum applied to said holes, and conveying the label to a predetermined wrapping position, and
      a base paper feed roller capable of properly adjusting the label supply speed to the label suction drum,
   (b) moving the label from the suction drum onto the outer circumference of a battery, from a direction tangential to the battery,
   (c) wrapping the label about the outer circumference of the battery while causing said batter to rotate by rotating a plurality of rollers on which said battery is situated.

11. A method according to claim 10, wherein the label suction drum is equally divided by slits on its outer circumference, a sensor is installed at a position corresponding to the slit to determine relative positions of the label and the slit, and means responsive to said sensor to adjust the speed for supplying the label are included to keep the position of the label held by vacuum on the outer circumference of the label suction drum within a predetermined range.

12. A method according to claim 10, wherein the label suction drum has a marking on its outer circumference to position the label on the outer circumference of the label suction drum within a predetermined range, and a sensor is installed at a position corresponding to the marking to determine a relative position of the label and the marking, and means for adjusting the speed for supplying the label said means responsive to the detected signal.

13. A method according to claim 10, including rotating the battery in the same direction of movement of the label, just before a leading end of the label contacts the outer circumference of the battery, at a peripheral speed nearly coinciding with a label wrapping speed.

14. An apparatus for wrapping a label about a battery comprising:

a battery conveying table for rotatably conveying the battery to a position for receiving the label, a drum for conveying the label to a predetermined position while holding the label by suction, and a plurality of rollers on which the battery is situated, said rollers for wrapping the label about an outer circumference of the battery, by causing the battery to rotate about an axis of the battery after the battery contacts the label by rotating said plurality of rollers under said battery.

15. An apparatus according to claim 14, wherein the batteries are cylindrical in shape.

16. An apparatus according to claim 14, wherein the battery conveying table is a revolving rotating element for conveying batteries, part of a running path of the battery rotating belt has the same center of rotation as the label suction drum, another part of the running path of the battery rotating belt has the same center of rotation as the battery conveying table.

17. An apparatus according to claim 16, further comprising a base paper feeding roller for moving base paper, wherein the base paper is in a shape of a band with glued on labels, the label peeled off from the base paper and supplied onto the label suction drum, and a speed adjusting motor including a differential gear mechanism in a drive system for the base paper feed roller.

18. An apparatus according to claim 16, wherein the battery conveying table has magnetic field generating means, the battery being held on the battery conveying table by a magnetic force of the magnetic field generating means.

19. An apparatus according to claim 16, wherein the battery conveying table has a magnet disposed near the battery conveying table, whereby the battery on the battery conveying table is held by the magnetic force of the magnet.

20. An apparatus according to claim 16, wherein the battery is cylindrical in shape, and the label is supplied continuously onto an outer circumference of the battery from a direction tangential to the outer circumference.

21. An apparatus according to claim 16, wherein the battery rotating belt is positioned between the label and the label suction drum on a surface of the label suction drum.

22. An apparatus according to of claim 16, wherein the label suction drum has at least one detection object selected from one of equally divided slits and markings and a sensor positioned corresponding to the detection object on an outer circumference of the label suction drum, relative positions of the label held on the label suction drum and the detection object detected by the sensor, and the label supply speed is adjusted by a detected signal.

23. A method according to claim 1, further comprising the step of orienting the battery on the conveying table on an edge of the battery.

24. A method according to claim 1, further comprising the step of maintaining the battery in contact with the conveying table with a magnetic field.

25. A method according to claim 1, wherein the battery is held onto the conveying table by force of gravity.

26. A method according to claim 10, wherein the battery conveying turntable conveys the battery along an edge of the battery.

27. A method according to claim 10, wherein the battery is held on the battery conveying turntable by a magnetic field.

28. A method according to claim 10, wherein the battery is held on the battery conveying turntable by force of gravity.

29. An apparatus according to claim 14, wherein the battery is held onto the conveying table by force of gravity.

30. An apparatus according to claim 14, wherein the battery conveying table conveys the battery along an edge of the battery.

31. A method according to claim 1, wherein a battery supporting roller is disposed on the conveying table, a belt is disposed so as to press the label to the battery, and the battery is supported in a sideways state between the battery supporting roller and the belt.

32. An apparatus according to claim 14, wherein a battery supporting roller is disposed on the conveying table, and the battery is supported in a sideways state between the battery supporting roller and the belt.

33. A method of wrapping a label about a cylindrical battery comprising the steps of:

(a) holding said label on a surface of a rotating label suction drum having a vacuum source, and (b) wrapping said label held on the label suction drum about an outer circumference of the battery by positioning the battery by causing the battery to rotate by rotating a plurality of rollers on which the battery is placed in order to rotate the battery.

34. A method of wrapping a label about a cylindrical battery comprising the steps of:

(a) holding said label on a surface of a rotating label suction drum having a vacuum source, and (b) wrapping said label held on the label suction drum about an outer circumference of the battery at a label supplying speed by positioning the battery at a battery conveying speed while a plurality of rollers on which said battery is placed are rotated in order to rotate the battery, wherein the battery conveying speed and the label supplying speed are equal.

35. An apparatus for wrapping a label about a battery comprising:

a battery conveying table for rotatably conveying the battery to a position for receiving the label, a drum for conveying the label to a predetermined position while holding the label by suction, and a plurality of battery supporting rollers disposed on the battery conveying table on which the battery is supported, said rollers caused to be rotated in order to rotate said battery, wherein the battery is supported in a sideways state.

36. A method of wrapping a label about a battery according to claim 1, wherein the plurality of rollers are rotated by a belt.

37. A method of wrapping a label about a battery according to claim 1, further comprising the step of peeling said label off a band shaped paper to which it has been attached.

38. A method of wrapping a label about a battery according to claim 1, further comprising the step of rotating a turntable about which said plurality of rollers are situated.

39. A method of wrapping a label about a battery according to claim 10, wherein said plurality of rollers are rotated by a belt.

40. A method of wrapping a label about a battery according to claim 10, further comprising the step of peeling said label off a band shaped paper to which it has been attached.

41. A method of wrapping a label about a battery according to claim 10, further comprising the step of rotating a turntable about which said plurality of rollers are situated.

42. An apparatus for wrapping a label about a battery according to claim 14, further comprising a turntable about which said plurality of rollers are located.

43. A method of wrapping a label about a battery according to claim 33, wherein the plurality of rollers are rotated by a belt.

44. A method of wrapping a label about a battery according to claim 33, further comprising the step of peeling said label off a band shaped paper to which it has been attached.

45. A method of wrapping a label about a battery according to claim 33, further comprising the step of rotating a turntable about which said plurality of rollers are situated.

46. A method of wrapping a label about a battery according to claim 34, wherein the plurality of rollers are rotated by a belt.

47. A method of wrapping a label about a battery according to claim 34, further comprising the step of peeling said label off a band shaped paper to which it has been attached.

48. A method of wrapping a label about a battery according to claim 34, further comprising the step of rotating a turntable about which said plurality of rollers are situated.

* * * * *

UNITED STATES PATENT AND TRADEMARK OFFICE
CERTIFICATE OF CORRECTION

PATENT NO. : 5,904,804
DATED : May 18, 1999
INVENTOR(S) : Kouda et al.

It is certified that error appears in the above-identified patent and that said Letters Patent is hereby corrected as shown below:

<u>Title page,</u>
Item [56] References Cited, U.S. PATENT DOCUMENTS,
"Ehlebeck" should be -- Ehlenbeck --.
Item [57] ABSTRACT, line 5, "trough" should be -- through --.

<u>Column 7, claim 3,</u>
Line 56, "2" should be -- 1 --.

<u>Column 8, claim 8,</u>
Line 15, "an" should be -- and --.

Signed and Sealed this

Eighteenth Day of September, 2001

Attest:

*Nicholas P. Godici*

NICHOLAS P. GODICI
*Attesting Officer*    *Acting Director of the United States Patent and Trademark Office*